March 17, 1953 D. J. SIKORRA 2,632,145

SELF-BIASING MAGNETIC AMPLIFIER

Filed Jan. 20, 1951 2 SHEETS—SHEET 1

Inventor
Daniel J. Sikorra
by Walter J. Madden, Jr.
Attorney

March 17, 1953 D. J. SIKORRA 2,632,145

SELF-BIASING MAGNETIC AMPLIFIER

Filed Jan. 20, 1951 2 SHEETS—SHEET 2

Inventor
Daniel J. Sikorra
by Walter J. Mulder Jr.
Attorney

Patented Mar. 17, 1953 2,632,145

UNITED STATES PATENT OFFICE 2,632,145

SELF-BIASING MAGNETIC AMPLIFIER

Daniel J. Sikorra, Milwaukee, Wis., assignor to Allis-Chalmers Manufacturing Company, Milwaukee, Wis.

Application January 20, 1951, Serial No. 207,012

12 Claims. (Cl. 323—89)

This invention relates in general to magnetic amplifiers and in particular to biasing circuits for polarized magnetic amplifiers.

The most common type of biasing for polarized magnetic amplifiers comprises a source of unidirectional voltage supplying separate bias windings of the amplifier to provide a reference level of magnetic saturation for the amplifier. This system suffers from the disadvantages of requiring a separate source of bias voltage and of reducing the gain of the amplifier because of the space required for the separate bias winding.

An additional biasing arrangement is disclosed and claimed in the application of Dale V. Hotson and Daniel J. Sikorra, Serial No. 200,140, filed December 11, 1950, in which the bias voltage and the control voltage to be amplified are impressed upon common control windings of the amplifier. This arrangement increases the gain of the amplifier, but has the disadvantage of requiring a separate source of bias voltage.

These disadvantages can be overcome by utilizing a polarized magnetic amplifier which requires no separate source of bias voltage and in which the amplifier gain is not decreased because of the presence of separate bias windings. One of the most suitable methods of securing the above results is to obtain the bias voltage from the amplifier output and impress this bias voltage on common bias and control windings.

It is therefore an object of this invention to provide a polarized magnetic amplifier which requires no separate source of bias voltage.

It is a further object of the present invention to provide a polarized magnetic amplifier in which the bias voltage is obtained from the amplifier output.

It is an additional object of the present invention to provide a polarized magnetic amplifier in which the amplifier output remains linear over a wide range of input values.

Objects and advantages other than those outlined above will be readily apparent from the following description when read in connection with the accompanying drawings, in which:

Fig. 1 diagrammatically illustrates the circuits and apparatus of one embodiment of the invention;

Figure 5:
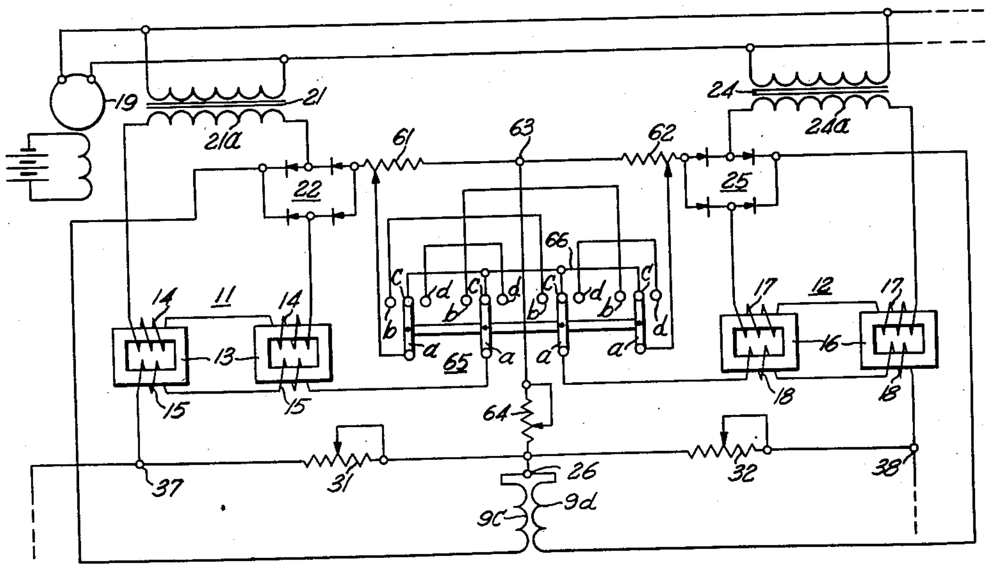
Figure 6:
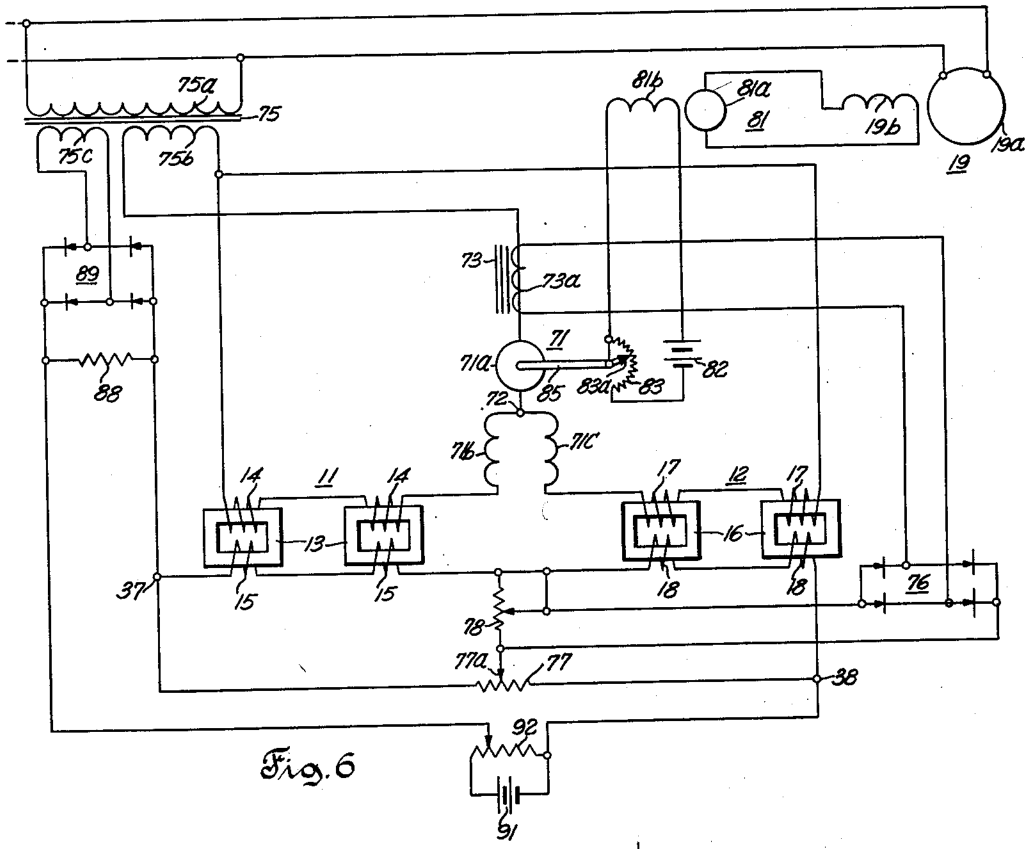

Fig. 5 diagrammatically illustrates the circuits and apparatus of an alternate embodiment of the invention; and Fig. 6 diagrammatically illustrates an additional alternate embodiment of the present invention.

Figure 1:
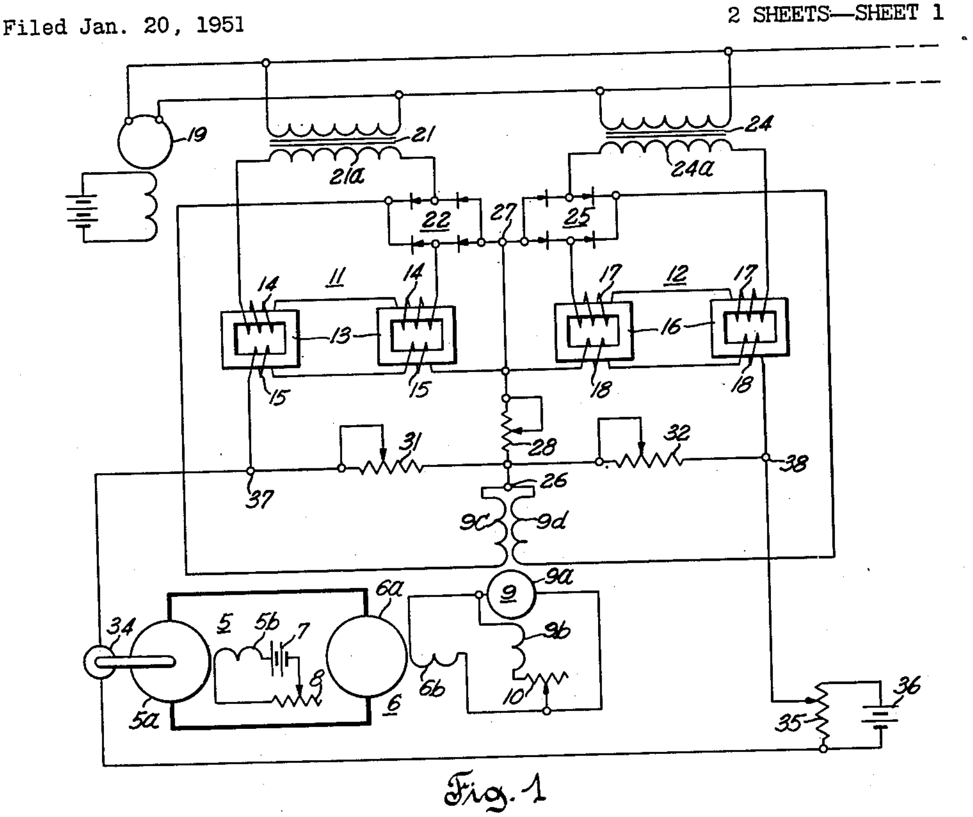

Referring to Fig. 1, one embodiment of the invention is shown utilized in a system for regulating the speed of a load device, such as a direct current motor 5. Motor 5 is provided with an armature 5a supplied from a suitable direct current source such as the armature 6a of a generator 6. Motor 5 is also provided with a field winding 5b energized from a suitable source such as a battery 7 through an adjustable resistor 8. Generator 6 is provided with a field winding 6b energized from a suitable source of controllable unidirectional voltage such as the armature 9a of an exciter generator 9. Generator 9 is provided with a self exciting field winding 9b connected across armature 9a in series with an adjustable resistor 10, and a pair of differentially acting field windings 9c, 9d, energized through the magnetic amplifier of this invention.

The amplifier comprises a first saturable reactor 11 and a second saturable reactor 12 identical to reactor 11. Reactor 11 may comprise a pair of saturable cores 13, a reactance winding 14 divided into two portions severally wound on the two cores and a control winding 15 likewise divided into two portions. Reactor 12 may likewise comprise a pair of saturable cores 16, a reactance winding 17, and a control winding 18. It will be understood that although the reactors 11, 12 have been shown each comprising a pair of saturable cores, conventional three-legged or four-legged cores would be equally suitable.

Reactance winding 14 is energized from any suitable alternating current source conventionally represented as a generator 19, through the secondary winding 21a of a transformer 21. A full wave rectifier 22 has its alternating current terminals connected in circuit with reactance winding 14 and secondary winding 21a. Reactance winding 17 is likewise connected to generator 19 through the secondary winding 24a of a transformer 24. A second full wave rectifier 25 has its alternating current terminals connected in circuit with secondary winding 24a and reactance winding 17. One direct current terminal of rectifier 22 is connected to a direct current terminal of like polarity of rectifier 25 and the other direct current terminals of rectifiers 22, 25 are connected to terminals of field windings 9c, 9d, respectively. Field windings 9c, 9d constitute load devices for reactors 11, 12 and are provided with a common terminal 26, which common terminal is connected to the common terminal 27 of rectifiers 22, 25 through suitable biasing means such as an adjustable resistor 28.

Field winding 9c is thus connected to reactor 11 and is energized by current varying in response to variations in the reactance of winding 14. Field winding 9d is likewise connected to reactor 12 and is energized by current varying in response to variations in the reactance of winding 17. Owing to the polarity of rectifiers 22, 25 the sum of the load currents through the field windings 9c, 9d traverses resistor 28 so that the voltage across resistor 28 is proportional to the sum of the currents through windings 9c, 9d.

Control windings 15 and 18 are connected in parallel with each other across resistor 28 to be impressed with bias voltages proportional to the sum of the currents through load devices 9c, 9d. The signal to be amplified in the system of Fig. 1 consists of the difference between a voltage proportional to the speed of motor 5 and the voltage of a suitable adjustable reference source. Motor 5 may be provided with a tachometer generator 34 to produce a unidirectional voltage proportional to the speed of motor 5. The voltage of tachometer 34 is compared with a substantially constant reference voltage impressed on a voltage divider 35 by a battery 36. Divider 35 and tachometer 34 therefore jointly constitute a source of control voltage of variable polarity and magnitude.

If separate windings are provided on each core for both the control signal to be amplified and for the bias current, windings 15, 18 may be connected directly across resistor 28 to carry the bias current. However, if the control signal to be amplified is also applied to windings 15, 18, as shown in Fig. 1, suitable resistance means are connected in circuit with windings 15, 18. Such resistance means may comprise a single tapped resistor or a pair of adjustable resistors 31, 32 connected in circuit with windings 15, 18, respectively.

The source of control voltage is provided with a first terminal 37 connected between winding 15 and resistor 31 and a second terminal 38 connected between winding 18 and resistor 32, to impress across terminals 37, 38 the difference between the voltage of divider 35 and the voltage of tachometer 34.

In operation of the system, assuming that machines 5, 6, 9 and 19 are running, machine 5 operates at a speed determined by the voltage of armature 6a which voltage is in turn determined by the voltage of armature 9a. Assuming that machine 5 is operating at the desired speed, the voltage of the adjustable portion of divider 35 is equal to the voltage of tachometer 34, so that no control voltage is impressed across terminals 37, 38 by divider 35 and tachometer 34. Under these conditions, the saturations of cores 13, 16 are determined only by the current supplied to windings 15, 18 through load devices 9c, 9d.

Since the reactances of windings 14, 17 are not infinite even when cores 13, 16 are completely unsaturated, small currents traverse windings 14, 17 and rectifiers 22, 25 as soon as generator 19 is energized. These small currents traverse field windings 9c, 9d and combine to produce a common voltage drop in resistor 28. This voltage drop in resistor 28, assuming that resistors 31, 32 are adjusted to equal values, impresses equal voltages on windings 15, 18 to saturate cores 13, 16 to predetermined equal extents and thereby increase the output currents of reactors 11, 12. This increase in output currents further increases the voltage drop across resistor 28 to further increase the saturations of cores 13, 16. The saturations of cores 13, 16 thus continue to build up to a value determined by the adjustment of resistor 28, and by suitable adjustment of resistor 28 the initial bias of cores 13, 16 thus obtained may be adjusted to any desired value to produce any desired output currents of reactors 11, 12. Under these conditions, the reactances of windings 14, 17 are equal, to supply equal currents to load devices 9c, 9d through rectifiers 22, 25. The net magnetomotive force of windings 9c, 9d is then zero. Assuming that resistor 10 is adjusted so that field winding 9b provides all the excitation needed to maintain the voltage of armature 9a at any given value, field winding 9b maintains the voltage of armature 9a at the value required to maintain the speed of motor 5 at the desired value.

If the speed of motor 5 increases above the desired value, the voltage of tachometer generator 34 increases above the voltage of divider 35 to cause a unidirectional control voltage to appear between terminals 37, 38. This control voltage is of a polarity to aid the voltage impressed on winding 15 from resistor 28 and to oppose the voltage impressed on winding 18 from resistor 28. This action increases the saturation of cores 13 and the current through winding 14 and decreases the saturation of cores 16 and the current through winding 17, to cause the saturations of reactors 11, 12 to vary oppositely in dependence upon the polarity of the control voltage. An increase in the current through field winding 9c above the current in field winding 9d produces a net magnetomotive force in these field windings to decrease the voltage of armature 9a to thereby return the speed of machine 5 to its desired value.

If the speed of machine 5 decreases below the desired value, the action of the regulating system to return the speed to the desired value is the reverse of that described above.

Figure 3:
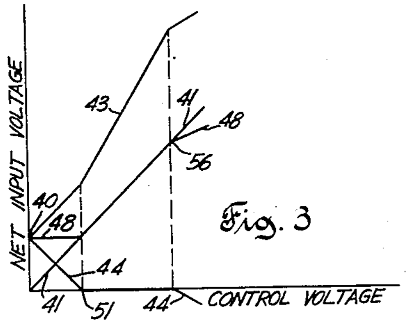
Figs. 3 and 4 are graphs illustrating the method of operation of circuits and apparatus in the drawings.
Figure 4:
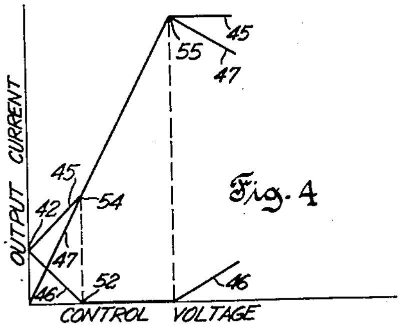
Figure 2:
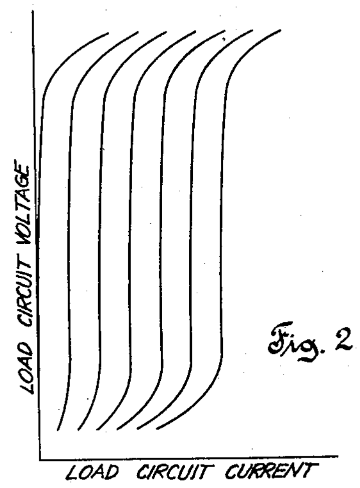
Fig. 2 is a graph including a series of curves representing various operating conditions of the embodiment shown in Fig. 1.

The method of operation of the amplifier may be understood by reference to Figs. 2, 3 and 4, which show the relations between the electric quantities of the amplifier. In Fig. 2, the rectified load circuit current of either one of reactors 11, 12 is plotted as a function of applied load circuit voltage for varying values of direct current traversing the control windings. The successive curves of Fig. 2, starting at the left side of Fig. 2, represent variations in the load circuit current for equal increments of increasing control winding current. The curves of Fig. 2 are equidistant, showing that if the initial bias current is set at a given value, an increase in control current by a given amount will increase the reactor output current as much as the reactor output current will be reduced if the control current is reduced by the given amount. It is apparent that this relation holds true over a wide range of control current and applied voltage.

Therefore, if a pair of reactors having characteristics as in Fig. 2 are initially biased with predetermined equal bias currents, increasing the control current in one reactor by a predetermined amount and decreasing the control current in the other reactor by the same predetermined amount will cause the sum of the two reactor output currents to remain substantially constant. In the embodiment of Fig. 1, this causes the sum of the currents through field windings 9c, 9d to be constant, thereby producing a substantially constant voltage drop in resistor 28 and a substantially constant bias voltage for windings 15, 18.

In Fig. 3, the net input voltage to windings 15, 18 is plotted as a function of the control voltage impressed between terminals 37, 38, while Fig. 4 is a plot of the currents in load devices 9c, 9d as functions of the control voltage. Point 40 of Fig. 3 represents the magnitude of the net voltage acting on the windings 15, 18 when the control voltage, represented by curve 41, has zero magnitude. The voltage of point 40 is the initial biasing voltage impressed on windings 15, 18 from resistor 28 by the build-up of current in reactors 11, 12 described above. Under these conditions, the voltages impressed on windings 15, 18 are equal, to produce equal reactances in windings 14, 17 and to produce equal currents through load devices 9c, 9d, represented by point 42 of Fig. 4.

As the control voltage increases from zero with a given polarity, the net voltage across winding 15 increases, as shown by curve 43 of Fig. 3, while the net voltage across winding 18 decreases, as shown by curve 44 of Fig. 3. An increase in the voltage of winding 15 increases the saturation of cores 13 to increase the current supplied to field winding 9c, as shown by curve 45 of Fig. 4. A decrease in the voltage of winding 18 decreases the saturation of cores 16 to decrease the current supplied to field winding 9d, as shown by curve 46 of Fig. 4. As the current through winding 14 increases, the current in winding 17 decreases by an equal amount, so that the sum of the currents in field windings 9c, 9d remain constant as explained above in connection with Fig. 2, to produce a constant voltage drop across resistor 28 and to impress on windings 15, 18 a constant bias voltage represented by curve 48 of Fig. 3.

The net magnetomotive force of differentially acting field windings 9c, 9d, which is proportional to the amplifier output, may be represented by the curve 47, having zero magnitude when the control voltage is zero and the currents through field windings 9c, 9d are equal, and increasing as the saturations of cores 13, 16 vary in response to increases in the control voltage. As the control voltage continues to increase, the net voltage across winding 15 continues to increase, while the voltage across windings 18 continues to decrease, thereby increasing the output of the amplifier linearly along curve 47 while the voltage impressed on windings 15, 18 from resistor 28 remains constant along curve 48.

When the control voltage impressed upon windings 15, 18 becomes equal to the portion of the voltage from resistor 28 which is impressed upon windings 15, 18, the voltage across winding 15 has a magnitude twice that of point 40 and the voltage across winding 18 is zero, causing the output current through winding 17 and field winding 9d to become zero, as shown by points 51 and 52 of Figs. 3 and 4, respectively. As the control voltage impressed on windings 15, 18 continues to increase beyond this value, the method of operation of the amplifier changes. The voltage across winding 15 continues to increase as before to increase the saturation of cores 13 and increase the current through field winding 9c. However, the current through winding 17 and field winding 9d does not decrease to a corresponding extent as it did between points 42 and 52, since rectifier 25 prevents this current from reversing. Therefore, since the increase in current through field winding 9c is not compensated for by a corresponding decrease in current through winding 9d to maintain the voltage of resistor 28 constant, the total current through resistor 28 increases to increase the voltage of resistor 28, as shown by the sloping portion of curve 48.

An increase in the voltage of resistor 28 increases the rate of saturation of cores 13 so that the output current of reactor 11 increases at a greater rate, as shown by the portion of curve 45 beyond point 54 in Fig. 4. The above described increase of the voltage of resistor 28 counteracts the increase in the control voltage impressed on winding 18 of reactor 12, so that the net voltage across winding 18 remains at substantially zero, thereby maintaining the output current of reactor 12 at substantially zero, as shown by the horizontal portion of curve 46.

It will be noted that the net output of reactors 11, 12, represented by curve 47, continues to increase linearly after passing point 54. This linear output represents a distinct advantage over a balanced amplifier having a fixed bias source, because the net output of such an amplifier does not increase after the control voltage equals the bias voltage, owing to the increase in the output current in the amplifier channel in which the bias signal and control signal are opposed.

When the control signal increases to a value where the output current of reactor 11 is limited by the impedance of load device 9c, further increases in control voltage will effect no further increases in the output current of reactor 11. This value is indicated by point 55 of curve 45 and point 56 of curve 41. As the control voltage continues to increase from point 56, the constant output current of reactor 11 traversing resistor 28 is not sufficient to counteract the increase in the control voltage across winding 18. Therefore, the winding 18 has impressed thereon a voltage which resaturates cores 16, causing the output current of reactor 12 to increase along the positively sloping portion of curve 46. This increase in output current of reactor 12 increases the voltage drop across resistor 28, so that the saturation of cores 16 increases to further increase the output current of reactor 12. The net amplifier output then decreases along the negatively sloping portion of curve 47. However, the slope of this portion of curve 47 is not as great as the slope of the positively sloping portion of curve 47, so that the amplifier output does not drop off abruptly after passing point 55.

Fig. 5 illustrates an alternate form of the invention embodying a switching arrangement to vary the operation of the amplifier. Reactors 11, 12 are connected in the same manner as shown in Fig. 1, with reactance windings 14, 17 connected to source 19 through rectifiers 22, 25 and transformers 21, 24, respectively. Resistance means comprising adjustable resistors 61, 62 and 64 are provided to control the current supplied to windings 15, 18. Resistors 61, 62 are serially connected between direct current terminals of like polarity of rectifiers 22, 25, and the other direct current terminals of rectifiers 22, 25 are connected to field windings 9c, 9d, respectively, as in Fig. 1. The common terminal 26 of field windings 9c, 9d is connected between resistors 31, 32, as in Fig. 1 and through biasing means in the form of resistor 64 to a common terminal 63 of resistors 61, 62.

A four pole, three position switch 65 having blades 65a and sets of contacts 65b, 65c, 65d is provided to vary the connections of control windings 15, 18. The adjustable taps of resistors 61, 62 are connected to the two outer blades 65*a*, and windings 15, 18 are connected to the two inner blades 65*a*. With switch 65 in the position shown, blades 65*a* engage contacts 65*c*, which contacts are connected together through a common conductor 66. This connection provides a circuit which is the electrical equivalent of the circuit of Fig. 1, assuming that the adjustable taps of resistors 61, 62 are adjusted equally, as resistors 61, 62 and 64 are equivalent to resistor 28 of Fig. 1. Therefore, the amplifier operates in a manner identical to that described above for the embodiment of Fig. 1.

If switch 65 is moved so that blades 65*a* engage contacts 65*b*, the adjustable tap of resistor 61 is connected to control winding 18 and the adjustable tap of resistor 62 is connected to control winding 15. This causes control winding 18 to have impressed thereon a bias voltage from resistor 64 and a feedback voltage proportional to the output current of reactor 11 from resistor 61, and causes control winding 15 to have impressed thereon a bias voltage from resistor 64 and a feedback voltage proportional to the output current of reactor 12 from resistor 62. When no control voltage is impressed between terminals 37, 38, the amplifier operates in a manner similar to that described above for the embodiment of Fig. 1, with the amplifier output current through resistor 64 furnishing equal biasing voltages to windings 15, 18, respectively. With equal biasing voltages impressed on windings 15, 18, cores 13, 16 are equally saturated, so that the output currents of reactors 11, 12 through load devices 9*c*, 9*d* are equal.

If a control voltage is impressed between terminals 37, 38, making terminal 37 positive with respect to terminal 38, winding 15 has impressed thereon the portion of the control voltage across resistor 31 and the voltages supplied from resistors 62, 64. These voltages are of cumulative polarities, so that the saturation of cores 13 increases to increase the output current of reactor 11. At the same time, the portion of the control voltage across resistor 32 opposes the voltages impressed from resistors 61, 64 on winding 18, so that the saturation of cores 16 decreases to decrease the output current of reactor 12.

However, the increase in the output current of reactor 11 increases the feedback voltage across resistor 61, so that the net voltage across winding 18 does not decrease to the extent that it would if the voltage of resistor 61 were constant. Likewise a decrease in the output current of reactor 12 decreases the feedback voltage across resistor 62, so that the net voltage across winding 15 does not increase to the extent that it would if the voltage of resistor 62 were constant. Thus, with switch 65 in the position to close contacts 65*b*, the amplifier is provided with negative feedback to reduce the amplifier gain and improve the amplifier stability and linearity. The amount of negative feedback provided may be readily varied by adjustment of the movable taps of resistors 61, 62.

If it is desired to operate the amplifier with positive feedback, blades 65*a* are moved to engage contacts 65*d*. This connects the adjustable tap of resistor 61 to winding 15 and connects the adjustable tap of resistor 62 to winding 18. With no control voltage appearing between terminals 37, 38, the amplifier operates as described above to develop a biasing voltage across resistor 64 and to saturate cores 13, 16 equally to produce equal currents through load devices 9*c*, 9*d*. If terminal 37 is caused to become positive with respect to terminal 38, the control voltage of resistor 31 and the voltages of resistors 61, 64 are of like polarity, so that the voltage across winding 15 increases to increase the saturation of cores 13 and to increase the output current of reactor 11. An increase in the output current of reactor 11 increases the feedback voltage of resistor 61 so that the voltage across winding 15 increases to further increase the saturation of cores 13.

At the same time, the control voltage impressed upon resistor 32 is of a polarity to oppose the voltages of resistors 62, 64 so that the saturation of cores 16 decreases to decrease the output current of reactor 12. A decrease in the output current of reactor 12 decreases the feedback voltage across resistor 62, thereby further decreasing the saturation of cores 16 and the output current of reactor 12. Thus, the positive feedback connections provide a larger change in the net energization of field windings 9*c*, 9*d* for a given control voltage than would occur if the voltages of resistors 61, 62 remained constant. If the control voltage is of a polarity to render terminal 38 positive with respect to terminal 37, the action of the amplifier is the reverse of that described above, to cause the saturation of reactors 11, 12 to vary oppositely.

Fig. 6 illustrates an alternate embodiment of the invention in which the amplifier controls an alternating current load circuit. The load devices of Fig. 6 comprise the field coils 71*b*, 71*c* of an electric motor 71 of the split-series or universal type provided with an armature 71*a*. Field coil 71*b* is serially connected with reactance winding 14 and field coil 71*c* is serially connected with reactance winding 17. Field coils 71*b*, 71*c* are provided with a common terminal 72 connected to armature 71*a*, and armature 71*a* is connected in series with the primary winding of a current transformer 73. Reactance windings 14, 17, with their associated field coils 71*b*, 71*c*, are energized in parallel from a suitable alternating current source, such as a secondary winding 75*b* of a transformer 75 having a primary winding 75*a* connected to generator 19.

The secondary winding 73*a* of current transformer 73 is connected to the alternating current terminals of a full wave rectifier 76 to form biasing means for producing across the direct current terminals of rectifier 76 a unidirectional voltage proportional to the current in the armature 71*a*. One direct current terminal of rectifier 76 is connected between windings 15, 18 and the other direct current terminal is connected to suitable resistance means. The resistance means may comprise a pair of resistors, such as resistors 31, 32 in Fig. 5, or may comprise a single adjustable resistor 77 having an adjustable intermediate tap 77*a* connected to a direct current terminal of rectifier 76. Rectifier 76 thereby supplies to windings 15, 18 equal voltages proportional to the current in armature 71*a*. An adjustable resistor 78 is connected across the direct current terminals of rectifier 76 to control the voltage impressed on windings 15, 18 by rectifier 76.

In the embodiment of Fig. 6, the amplifier is utilized to control the voltage of a generator 19 having an armature 19*a*. Generator 19 is provided with a field winding 19*b* supplied with current from the armature 81*a* of an exciter 81. Exciter 81 is provided with a field winding 81*b* supplied with current from a suitable direct current source, such as a battery 82, through a rheostat 83 provided with an adjustable tap 83a. Tap 83a is connected through a shaft 85 to the armature 71a of motor 71, so that the current supplied to field winding 81b is varied in response to variations in the energization of field coils 71b, 71c.

Reactors 11, 12 are provided with a suitable measure of the regulated quantity, such as the voltage impressed upon a resistor 88 by a full wave rectifier 89 connected to a secondary winding 75c of transformer 75. The voltage of resistor 88 is compared with the adjustable voltage of a suitable reference source, such as a battery 91 supplying a voltage divider 92 to provide a control voltage varying in polarity and magnitude in dependence upon the direction and magnitude of variations in the voltage of armature 19a from a predetermined desired value. This control voltage may be impressed upon separate control windings of reactors 11, 12, as is well known in the art, or may be impressed across terminals 37, 38 as in Fig. 6.

If the voltage of armature 19a has the desired value, the voltage of the adjustable portion of divider 92 is equal to the voltage of resistor 88, so that no voltage is impressed across terminals 37, 38 by resistor 88 and divider 92. Under these conditions, the reactance windings 14, 17 permit predetermined currents to flow through field windings 71b, 71c, respectively. The sum of the predetermined currents through field coils 71b, 71c traverses the primary winding of transformer 73 to cause the bias voltage across windings 15, 18 to build up as in Figs. 1 and 3. This bias voltage saturates cores 13, 16 to equal degrees to produce equal reactances in windings 14, 17 and equal currents in coils 71b, 71c. With equal currents in field coils 71b, 71c the torque of motor 71 is zero, so that tap 83a remains in its predetermined position to maintain the voltage of armature 19a at its desired value.

If the voltage of armature 19a decreases below the desired value, terminal 37 becomes positive with respect to terminal 38 to impress a control voltage on windings 15, 18. This control voltage aids the bias voltage impressed on winding 15 by rectifier 76 so that the saturation of cores 13 increases to increase the current through winding 14 and coil 71b. The control voltage opposes the bias voltage impressed on winding 18 by rectifier 76 so that the saturation of cores 16 decreases to decrease the current through winding 17 and coil 71c. An increase in the current in coil 71b with respect to the current in coil 71c produces a torque in motor 71, causing motor 71 to rotate to move tap 83a of resistor 83 in a direction to increase the current in field winding 81b. This increase in field current increases the voltage of armature 19a to return the voltage of armature 19a to its desired value.

During the above described operation, the control voltage impressed between terminals 37, 38 causes the current of winding 14 to increase by an amount equal to the amount by which the current of winding 17 is decreased, as shown by the curves of Fig. 2, so that the sum of the currents through coils 71b, 71c remains substantially constant. This substantially constant current traverses the primary winding of current transformer 73 to produce a substantially constant bias voltage across rectifier 76. Thus, the embodiment of Fig. 6 operates as shown by the curves of Figs. 3 and 4, to provide a bias voltage to windings 15, 18 which renders the differential output of reactors 11, 12 a linear function of the control voltage.

If the voltage of armature 19a increases above the desired value, the operation of the amplifier is the reverse of that described above, to reduce the armature voltage to its desired value.

Although but three embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a balanced magnetic amplifier, the combination of a first saturable reactor comprising a first control winding and a first reactance winding, a second saturable reactor comprising a second control winding and a second reactance winding, a source of alternating current for energizing said reactance windings, a first rectifier having its alternating current terminals connected in circuit with said first reactance winding and said source, a second rectifier having its alternating current terminals connected in circuit with said second reactance winding and said source, a first load device connected in circuit with the direct current terminals of said first rectifier, a second load device connected in circuit with the direct current terminals of said second rectifier, an impedance device connected in series with said load devices and said rectifiers, and means connecting said control windings in parallel with each other across said impedance device to supply said control windings with equal currents proportional to the sum of the currents in said load devices.

2. In a balanced magnetic amplifier, the combination of a first saturable reactor comprising a first control winding and a first reactance winding, a second saturable reactor comprising a second control winding and a second reactance winding, a source of alternating current for energizing said reactance windings, a first full wave rectifier having its alternating current terminals connected in circuit with said first reactance winding and said source, a second full wave rectifier having its alternating current terminals connected in circuit with said second reactance winding and said source, a first load device connected in circuit with the direct current terminals of said first rectifier, a second load device connected in circuit with the direct current terminals of said second rectifier, a first common terminal for said load devices, a second common terminal for direct current terminals of like polarity of said rectifiers, an impedance device connected between said first and second common terminals, whereby said impedance device is traversed by a current proportional to the sum of the currents in said load devices, a first resistor, means connecting said first resistor and said first control winding across said impedance device, a second resistor, means connecting said second resistor and said second control winding across said impedance device, whereby said control windings are supplied with currents proportional to the current traversing said impedance device, and a source of control voltage of variable polarity and magnitude connected across said first and second resistors and said control windings to cause the saturations of said first and second reactors to vary oppositely in dependence upon the polarity of said control voltage.

3. In a balanced magnetic amplifier, the combination of a first saturable reactor having a first control winding and a first reactance winding, a second saturable reactor having a second control winding and a second reactance winding, a first full wave rectifier, a second full wave rectifier, a first alternating current circuit including said first reactance winding and the alternating current terminals of said first rectifier, a second alternating current circuit including said second reactance winding and the alternating current terminals of said second rectifier, a first load device connected to be energized in dependence upon the reactance of said first reactance winding, a second load device connected to be energized in dependence upon the reactance of said second reactance winding, resistance means connected across the direct current terminals of said first and second rectifiers, and means connecting said control windings in parallel with each other across said resistance means, whereby said control windings are supplied with equal currents proportional to the sum of the currents in said first and second load devices.

4. In a balanced magnetic amplifier, the combination of a first saturable reactor having a first control winding and a first reactance winding, a second saturable reactor having a second control winding and a second reactance winding, a source of alternating current for energizing said reactance windings, a first full wave rectifier having its alternating current terminals connected with said source through said first reactance winding, a second full wave rectifier having its alternating current terminals connected with said source through said second reactance winding, a first load device connected in circuit with the direct current terminals of said first rectifier, a second load device connected in circuit with the direct current terminals of said second rectifier, resistance means connected in circuit with said load devices and said rectifiers, whereby said resistance means is supplied with current proportional to the sum of the currents in said load devices, and means connecting said control windings in parallel with each other across said resistance means to supply to said control windings equal currents proportional to the sum of the currents in said load devices.

5. In a balanced magnetic amplifier, the combination of a first saturable reactor comprising a first control winding and a first reactance winding, a second saturable reactor comprising a second control winding and a second reactance winding, a first load device serially connected with said first reactance winding, a second load device serially connected with said second reactance winding, a common terminal for said reactance windings, a common terminal for said load devices, a source of alternating current connected across said common terminals, means connected between said source and one of said common terminals for producing a rectified voltage proportional to the sum of the currents in said load devices, and means for impressing said rectified voltage on said control windings to bias said reactors to predetermined degrees of saturation.

6. In a balanced magnetic amplifier, the combination of a first saturable reactor comprising a first reactance winding and a first control winding, a second saturable reactor comprising a second reactance winding and a second control winding, a source of alternating current connected to said reactance windings, a first load device connected to said first saturable reactor to be energized with current variable in dependence upon the reactance of said first reactance winding, a second load device connected to said second saturable reactor to be energized with current variable in dependence upon the reactance of said second reactance winding, means including rectifier means connected to said load devices for producing a unidirectional bias voltage proportional to the sum of the currents in said load devices, and means for impressing said bias voltage on said control windings to bias said reactors to predetermined equal degrees of saturation.

7. In a balanced magnetic amplifier, the combination of a first saturable reactor having a first reactance winding and a first control winding, a second saturable reactor having a second reactance winding and a second control winding, a first load device serially connected with said first reactance winding, a second load device serially connected with said second reactance winding, a common terminal for said load devices, a common terminal for said reactance windings, a source of alternating current connected across said common terminals, a current transformer having a primary winding connected between said source and one of said common terminals, a secondary winding for said transformer for producing a voltage proportional to the sum of the currents in said load devices, a full wave rectifier connected across said secondary winding for producing a rectified bias voltage proportional to the voltage of said secondary winding, and means for impressing said rectified bias voltage on said control windings to bias said reactors to predetermined equal degrees of saturation.

8. In a balanced magnetic amplifier, the combination of a first saturable reactor having a first reactance winding and a first control winding, a second saturable reactor having a second reactance winding and a second control winding, a source of alternating current connected to said reactance windings, a first load device connected to said first saturable reactor to be energized with current variable in dependence upon the reactance of said first reactance winding, a second load device connected to said second saturable reactor to be energized with current variable in dependence upon the reactance of said second reactance winding, biasing means connected to said load devices for producing a unidirectional bias voltage proportional to the sum of the currents in said load devices, first resistance means serially connected with said first control winding across said biasing means, second resistance means serially connected with said second control winding across said biasing means, a source of control voltage of variable polarity and magnitude having a first terminal and a second terminal, means connecting said first terminal between said first control winding and said first resistance means, and means connecting said second terminal between said second control winding and said second resistance means, whereby the saturations of said reactors very oppositely in dependence upon the polarity of said control voltage.

9. In a balanced magnetic amplifier, the combination of a first saturable reactor comprising a first reactance winding and a first control winding, a second saturable reactor comprising a second reactance winding and a second control winding, a source of alternating current connected to said reactance windings, a first full wave rectifier having its alternating current terminals connected in circuit with said source and said first reactance winding, a second full wave rectifier having its alternating current terminals connected in circuit with said source and said second reactance winding, a first resistor and a second resistor serially connected with each other between a direct current terminal of said first rectifier and a direct current terminal of like polarity of said second rectifier, a first load device having a terminal connected to the other direct current terminal of said first rectifier, a second load device having a terminal connected to the other direct current terminal of said second rectifier, a first common terminal for said load devices, a second common terminal for said first and second resistors, biasing means connected between said common terminals, a first adjustable tap for said first resistor, means connecting said first control winding between said first adjustable tap and said first common terminal to energize said first control winding with current proportional to the current through said first load device, a second adjustable tap for said second resistor, and means connecting said second control winding between said second adjustable tap and said first common terminal to energize said second control winding with current proportional to the current through said second load device.

10. In a balanced magnetic amplifier, the combination of a first saturable reactor comprising a first reactance winding and a first control winding, a second saturable reactor comprising a second reactance winding and a second control winding, a source of alternating current connected to said reactance windings, a first full wave rectifier having its alternating current terminals connected in circuit with said source and said first reactance winding, a second full wave rectifier having its alternating current terminals connected in circuit with said source and said second reactance winding, a first resistor and a second resistor serially connected with each other between a direct current terminal of said first rectifier and a direct current terminal of like polarity of said second rectifier, a first load device having a terminal connected to the other direct current terminal of said first rectifier, a second load device having a terminal connected to the other direct current terminal of said second rectifier, a first common terminal for said load devices, a second common terminal for said first and second resistors, a first adjustable tap for said first resistor, biasing means connected between said common terminals, first resistance means serially connected with said first control winding between said first adjustable tap and said first common terminal to energize said first control winding with current proportional to the current through said first load device, a second adjustable tap for said second adjustable resistor, second resistance means serially connected with said second control winding between said second adjustable tap and said first common terminal to energize said second control winding with current proportional to the current through said second load device, a source of control voltage of variable polarity and magnitude having a first terminal and a second terminal, means connecting said first terminal of said source between said first resistance means and said first control winding, and means connecting said second terminal of said source between said second resistance means and said second control winding to cause the saturations of said reactors to vary oppositely in dependence upon the polarity of said control voltage.

11. In a balanced magnetic amplifier, the combination of a first saturable reactor comprising a first reactance winding and a first control winding, a second saturable reactor comprising a second reactance winding and a second control winding, a source of alternating current connected to said reactance windings, a first full wave rectifier having its alternating current terminals connected in circuit with said source and said first reactance winding, a second full wave rectifier having its alternating current terminals connected in circuit with said source and said second reactance winding, a first resistor and a second resistor serially connected with each other between a direct current terminal of said first rectifier and a direct current terminal of like polarity of said second rectifier, a first load device having a terminal connected to the other direct current terminal of said first rectifier, a second load device having a terminal connected to the other direct current terminal of said second rectifier, a first common terminal for said load devices, a second common terminal for said first and second resistors, biasing means connected between said common terminals, a first adjustable tap for said first resistor, means connecting said second control winding between said first adjustable tap and said first common terminal to energize said second control winding with current proportional to the current through said first load device, a second adjustable tap for said second resistor, and means connecting said first control winding between said second adjustable tap and said first common terminal to energize said first control winding with current proportional to the current through said second load device.

12. In a balanced magnetic amplifier, the combination of a first saturable reactor comprising a first reactance winding and a first control winding, a second saturable reactor comprising a second reactance winding and a second control winding, a source of alternating current connected to said reactance windings, a first full wave rectifier having its alternating current terminals connected in circuit with said source and said first reactance winding, a second full wave rectifier having its alternating current terminals connected in circuit with said source and said second reactance winding, a first resistor and a second resistor serially connected with each other between a direct current terminal of said first rectifier and a direct current terminal of like polarity of said second rectifier, a first load device having a terminal connected to the other direct current terminal of said first rectifier, a second load device having a terminal connected to the other direct current terminal of said second rectifier, a first common terminal for said load devices, a second common terminal for said first and second resistors, biasing means connected between said common terminals, a first adjustable tap for said first resistor, first resistance means serially connected with said second control winding between said first adjustable tap and said first common terminal to energize said second control winding with current proportional to the current through said first load device, a second adjustable tap for said second adjustable resistor, second resistance means serially connected with said first control winding between said second adjustable tap and said first common terminal to energize said first control winding with current proportional to the current through said second load device, a source of control voltage of variable polarity and magnitude having a first terminal and a second terminal, means connecting said first terminal of said source between said first resistance means and said second control winding, and means connecting said second terminal of said source between said second resistance means and said first control winding to cause the saturations of said reactors to vary oppositely in dependence upon the polarity of said control voltage.

DANIEL J. SIKORRA.

REFERENCES CITED

The following references are of record in the file of this patent:

UNITED STATES PATENTS

| Number | Name | Date |
|---|---|---|
| 2,552,952 | Gachet | May 15, 1951 |